US 9,897,456 B2

(12) United States Patent
Hoareau et al.

(10) Patent No.: US 9,897,456 B2
(45) Date of Patent: Feb. 20, 2018

(54) DYNAMICALLY ESTABLISHING A TEMPORARY SAFE ROUTE VIA A NETWORK OF UNMANNED AERIAL VEHICLES

(71) Applicant: International Business Machines Corporation, Armonk, NY (US)

(72) Inventors: Guillaume Hoareau, Montpellier (FR); Johannes J. Liebenberg, Johannesburg (ZA); John G. Musial, Newburgh, NY (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/234,635

(22) Filed: Aug. 11, 2016

(65) Prior Publication Data
US 2017/0199044 A1    Jul. 13, 2017

Related U.S. Application Data

(63) Continuation of application No. 14/991,302, filed on Jan. 8, 2016, now Pat. No. 9,464,907.

(51) Int. Cl.
*G01C 21/34* (2006.01)
*G01C 21/20* (2006.01)
(Continued)

(52) U.S. Cl.
CPC ........ *G01C 21/3415* (2013.01); *B64C 39/024* (2013.01); *G01C 21/20* (2013.01);
(Continued)

(58) Field of Classification Search
CPC .............. G01C 21/20; G01C 21/3415; G01C 21/3632; G01C 21/3691; B64C 39/024; G08G 5/0069
(Continued)

(56) References Cited

U.S. PATENT DOCUMENTS 8,060,270 B2    11/2011   Vian et al.
8,386,110 B2    2/2013    Maekawa et al.
(Continued)

OTHER PUBLICATIONS

Jawhar et al. "UAV-Based Data Communication in Wireless Sensor Networks: Models and Strategies", International Conference on Unmanned Aircraft Systems (ICUAS); Jun. 2015.
(Continued)

*Primary Examiner* — Thomas G Black
*Assistant Examiner* — Luke Huynh
(74) *Attorney, Agent, or Firm* — Brown & Michaels, PC; James Nock (57) ABSTRACT

Dynamically establishing a temporary safe evacuation route away from an unsafe situation using unmanned vehicles. The temporary safe evacuation route is determined based on real-time information regarding the unsafe situation. A network of unmanned vehicles are deployed and positioned at determined points along the safe evacuation route. Guidance is provided to the network of unmanned vehicles for display along the safe evacuation route by the unmanned vehicle to aid people in evacuating from the unsafe situation. Information in real time regarding the unsafe situation may be received from the unmanned vehicles. Based on the information received, the safe evacuation route may be adjusted.

20 Claims, 9 Drawing Sheets

(51) Int. Cl.
G01C 21/36 (2006.01)
B64C 39/02 (2006.01)
(52) U.S. Cl.
CPC ..... *G01C 21/3632* (2013.01); *G01C 21/3691* (2013.01); *B64C 2201/024* (2013.01); *B64C 2201/12* (2013.01); *B64C 2201/146* (2013.01)
(58) Field of Classification Search
USPC .................... 701/533, 2, 3, 117–120; 244/13
See application file for complete search history.

(56) References Cited

U.S. PATENT DOCUMENTS

| | | | | |
|---|---|---|---|---|
| 8,768,623 | B2* | 7/2014 | Krzanowski | G01C 21/3492 340/995.13 |
| 8,825,225 | B1 | 9/2014 | Stark et al. | |
| 8,977,481 | B1 | 3/2015 | Downs | |
| 9,051,043 | B1 | 6/2015 | Peeters et al. | |
| 9,087,451 | B1* | 7/2015 | Jarrell | G08G 5/0069 |
| 9,094,816 | B2 | 7/2015 | Maier et al. | |
| 9,466,218 | B2* | 10/2016 | Jarrell | G08G 5/0069 |
| 9,635,534 | B2* | 4/2017 | Maier | H04M 1/7255 |
| 2003/0006897 | A1 | 1/2003 | Chapin et al. | |
| 2008/0046134 | A1 | 2/2008 | Bruce et al. | |
| 2010/0250022 | A1 | 9/2010 | Hines et al. | |
| 2012/0226394 | A1 | 9/2012 | Marcus | |
| 2012/0261144 | A1 | 10/2012 | Vian et al. | |
| 2014/0222329 | A1 | 8/2014 | Frey | |
| 2014/0288730 | A1 | 9/2014 | Fucke et al. | |
| 2015/0158513 | A1 | 6/2015 | Costa et al. | |
| 2016/0223333 | A1* | 8/2016 | Thakur | G01C 21/20 |

OTHER PUBLICATIONS

Terwilliger et al. "Influencing Factors for Use of Unmanned Aerial Systems in Support of Aviation Accident and Emergency Response", Journal of Automation and Control Engineering vol. 3, No. 3, Jun. 2015.
"Up Up and Away: Commercial Drone Market Ready for Take Off", retrieved from http://blogs.imediaconnection.com/blog/2014/08/30/up-up-and-away-commercial-drone-market-ready-for-take-off/; Aug. 2014.
"Teal Group Predicts Worldwide UAV Market Will Total $91 Billion in Its 2014 UAV Market Profile and Forecast", retrieved from http://www.tealgroup.com/index.php/about-teal-group-corporation/press-releases/118-2014-uav-press-release; Jul. 2014.
"Roll out your OLED TV like a projector screen or turn a window into a TV, thanks to LG", retrieved from http://www.pocket-lint.com/news/129815-roll-out-your-oled-tv-like-a-projector-screen-or-turn-a-window-into-a-tv-thanks-to-lg; as early as Jul. 2014.
"Building Emergency Action Plan", The Ohio State University; Version 2; Oct. 2012.
Chang, A. "With Prime Air, Amazon plans to deliver purchases via drones", retrieved from http://articles.latimes.com/2013/dec/02/business/la-fi-tn-amazon-prime-air-20131202; Dec. 2013.
Morgan, D. "FAA to name adviser to handle 'crush' of industry drone queries", retrieved from http://www.reuters.com/article/2015/06/03/us-usa-drones-faa-idUSKBN0OJ27520150603; Jun. 2015.
"Introducing the Flexible Curved OLED"; retrieved from http://news.oled-display.net/flexible-curved-oled/; as early as Jan. 2014.
'The Drones Report: Market forecasts, regulatory barriers, top vendors, and leading commercial applications', Business Insider; retrieved from http://www.businessinsider.com/uav-or-commercial-drone-market-forecast-2015-2; May 2015.
Stone, M. "Amazon Can (Finally) Test Its Delivery Drones in the United States", retrieved from http://gizmodo.com/amazon-can-finally-test-its-delivery-drones-in-the-un-1697124779?trending_test_b&utm_expid=66866090-62._DVNDEZYQh2S4K00ZSnKcw.2; Apr. 2015.
Condliffe, J. "Amazon is Testing Its Delivery Drones in a Secret Location in Canada", retrieved from http://gizmodo.com/amazon-is-testing-its-delivery-drones-in-a-secret-locat-1694480406?trending_test_b&utm_expid=66866090-62._DVNDEZYQh2S4K00ZSnKcw.2; Mar. 2015.
Brehmer, E. "Unmanned aerial vehicle industry taking off in Alaska", Alaska Journal of Commerce; retrieved from http://www.alaskajournal.com/business-and-finance/2013-11-20/unmanned-aerial-vehicle-industry-taking-alaska; Nov. 2013.
Basulto, D. "Forget the doubters, commercial drones are here to stay", The Washington Post; retrieved from https://www.washingtonpost.com/news/innovations/wp/2013/12/03/forget-the-doubters-commercial-drones-are-here-to-stay/; Dec. 2013.
Wilbanks, C. "Drones: A big industry waiting to be born", retrieved from http://www.cbsnews.com/news/drones-a-big-industry-waiting-to-be-born/; May 2013.
Jager, E. "Domestic Drone Industry Can Boost Economy", retrieved from http://www.newsmax.com/Newsfront/drone-economy-domestic-boost/2013/12/03/id/539607/; Dec. 2013.
Chow, D. "Commercial Drones Could Grow Into $10 Billion Industry, Experts Say", retrieved from http://www.livescience.com/41009-commercial-drones-market-value.html; Nov. 2013.
"All Clear Given at Washington Navy Yard", retrieved from http://www.nbcwashington.com/news/local/Police-Activity-Reported-at-Washington-Navy-Yard-311426321.html; Jul. 2015.
Dillow, C. "What is the drone industry really worth?", retrieved from http://fortune.com/2013/03/12/what-is-the-drone-industry-really-worth/; Mar. 2013.
"MIT developes guide-drone to ease campus confusion" retrieved from https://www.youtube.com/watch?v=Pmshx1LEy18; Nov. 2013.
List of related applications. Aug. 3, 2016.

* cited by examiner

DYNAMICALLY ESTABLISHING A TEMPORARY SAFE ROUTE VIA A NETWORK OF UNMANNED AERIAL VEHICLES

BACKGROUND

The present invention relates to dynamically establishing a temporary safe route, and more specifically to dynamically establishing a temporary safe route via a network of unmanned vehicles.

Unmanned vehicles may comprise any vehicle that does not require a human operator to be located within the vehicle such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable the vehicle to know it's location and self determine a safe route), a pre-programmed vehicle, etc.

For example, unmanned aerial vehicles (UAVs) are aerial vehicles that do not contain a human pilot within the vehicle. In the past, unmanned aerial vehicles have mostly found military and special operation applications, but also are increasingly finding uses in civil applications, such as policing and firefighting, and nonmilitary security work, such as inspection of power or pipelines.

SUMMARY

According to one embodiment of the present invention, a method of dynamically establishing a temporary safe evacuation route away from an unsafe situation using unmanned cognitive vehicles is disclosed. The method comprising the steps of: the unmanned cognitive vehicles receiving a deployment to the unsafe situation and positioning information regarding placement of the unmanned cognitive vehicles at determined points along the temporary safe evacuation route; the unmanned cognitive vehicles detecting and determining information regarding the unsafe situation through autonomic functionality sensors; the unmanned cognitive vehicles relaying the information regarding the unsafe situation to peer unmanned cognitive vehicles; the unmanned cognitive vehicles displaying guidance along the safe evacuation route to aid people in evacuating from the unsafe situation; the unmanned cognitive vehicles receiving information regarding whether the unsafe situation has been altered from peer unmanned cognitive vehicles; and the unmanned cognitive vehicles, based on the information received, determining whether the safe evacuation route should be adjusted.

According to another embodiment of the present invention, a computer program product for dynamically establishing a temporary safe evacuation route away from an unsafe situation using unmanned vehicles is disclosed. The program instructions comprising: receiving, by the computer of the unmanned cognitive vehicles, a deployment to the unsafe situation and positioning information regarding placement of the unmanned cognitive vehicles at determined points along the temporary safe evacuation route; detecting and determining, by the computer of the unmanned cognitive vehicles, information regarding the unsafe situation through autonomic functionality sensors; relaying, by the computer of the unmanned cognitive vehicles, the information regarding the unsafe situation to peer unmanned cognitive vehicles; displaying, by the computer of the unmanned cognitive vehicles, guidance along the safe evacuation route to aid people in evacuating from the unsafe situation; receiving, by the computer of the unmanned cognitive vehicles, information regarding whether the unsafe situation has been altered from peer unmanned cognitive vehicles; and based on the information received, determining, by the computer of the unmanned cognitive vehicles, whether the safe evacuation route should be adjusted.

According to another embodiment of the present invention, a computer system for dynamically establishing a temporary safe evacuation route away from an unsafe situation using unmanned vehicles is disclosed. The computer system comprising a computer comprising at least one processor, one or more memories, one or more computer readable storage media having program instructions executable by the computer to perform the program instructions. The program instructions comprising: receiving, by the computer of the unmanned cognitive vehicles, a deployment to the unsafe situation and positioning information regarding placement of the unmanned cognitive vehicles at determined points along the temporary safe evacuation route; detecting and determining, by the computer of the unmanned cognitive vehicles, information regarding the unsafe situation through autonomic functionality sensors; relaying, by the computer of the unmanned cognitive vehicles, the information regarding the unsafe situation to peer unmanned cognitive vehicles; displaying, by the computer of the unmanned cognitive vehicles, guidance along the safe evacuation route to aid people in evacuating from the unsafe situation; receiving, by the computer of the unmanned cognitive vehicles, information regarding whether the unsafe situation has been altered from peer unmanned cognitive vehicles; and based on the information received, determining, by the computer of the unmanned cognitive vehicles, whether the safe evacuation route should be adjusted.

DETAILED DESCRIPTION

In an illustrative embodiment of the present invention, a plurality of unmanned vehicles may be networked such that when an unsafe condition is determined at a location where people would need to be evacuated quickly or detoured temporarily, the network of unmanned vehicles could be rapidly deployed to assist at the location. The unmanned vehicles may be based at the location itself or at a remote location and travel to the impacted area.

The unmanned vehicles may be aquatic, terrestrial, aerial or a combination thereof.

It should be noted that a network of unmanned vehicles could be deployed very quickly in an emergency, shut down quickly after the emergency and returned to their point of origin, locally stored at a venue, centrally based and quickly directed to a location which is impacted. The unmanned vehicles may be controlled by someone located at the impacted area itself or someone located remotely using the unmanned vehicles as an observation tool.

In an illustrative embodiment of the present invention, the unmanned vehicles may be prepopulated with venue plans, evacuation scenarios, available exits, street maps, or other information in an advance of any emergency. The unmanned vehicles are preferably not confined to one building or location and may expand to beyond the impact area to provide a safe route via the surrounding area or streets. The unmanned vehicles may be dynamically adjusted based on changing conditions at an impacted location.

If the unmanned vehicles are UAVs, the UAVs are not restricted to conditions on the ground and may be deployed to an impacted area where land vehicles cannot reach. Similarly, unmanned vehicles which are aquatic may be deployed to an impacted area where land vehicles cannot reach.

Figure 1:
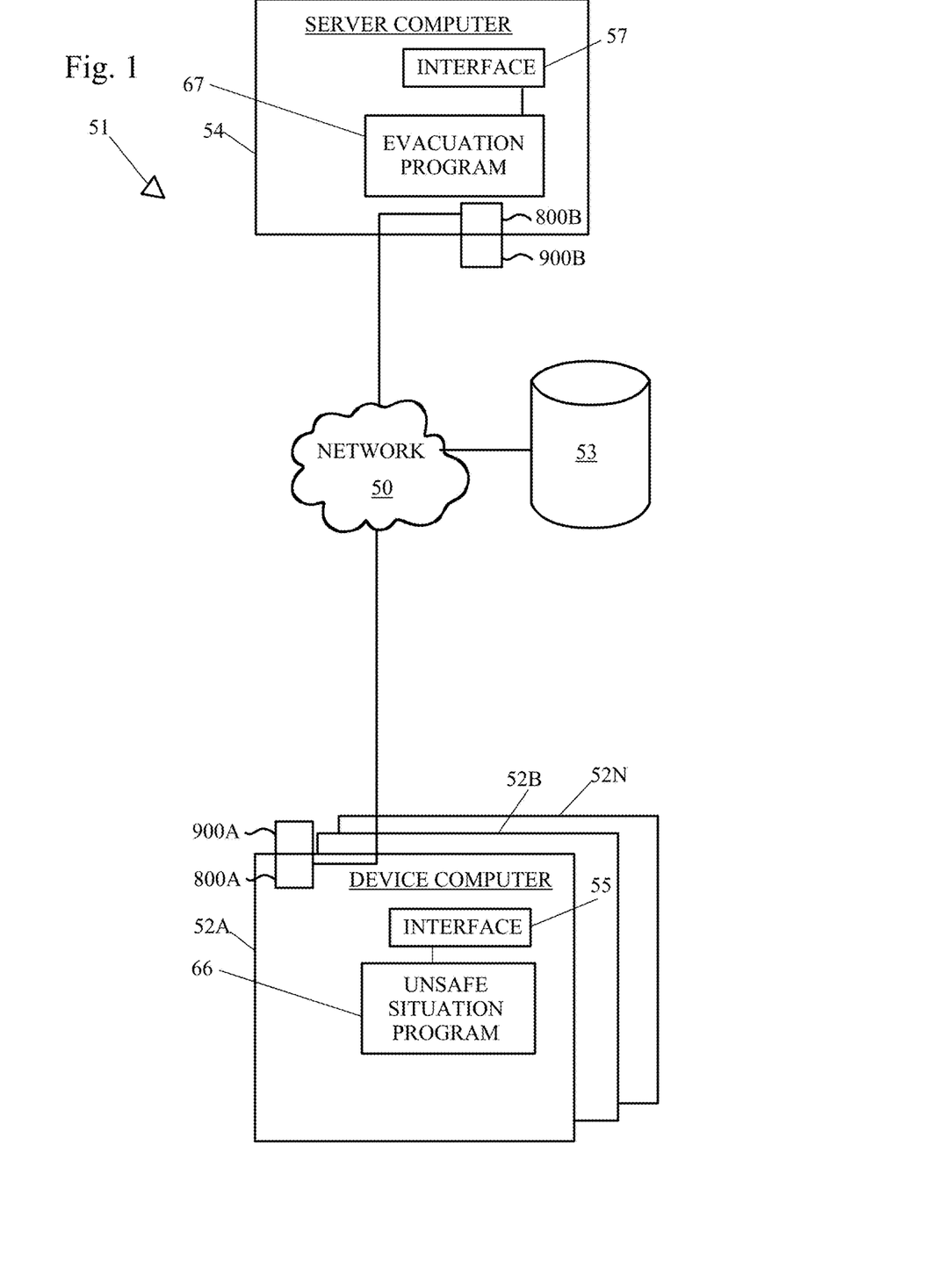
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, multiple client computers 52A-52N, storage unit 53, and server computer 54 connect to network 50. In other exemplary embodiments, network data processing system 51 may include additional client computers, storage devices, server computers, and other devices not shown.

Figure 9:
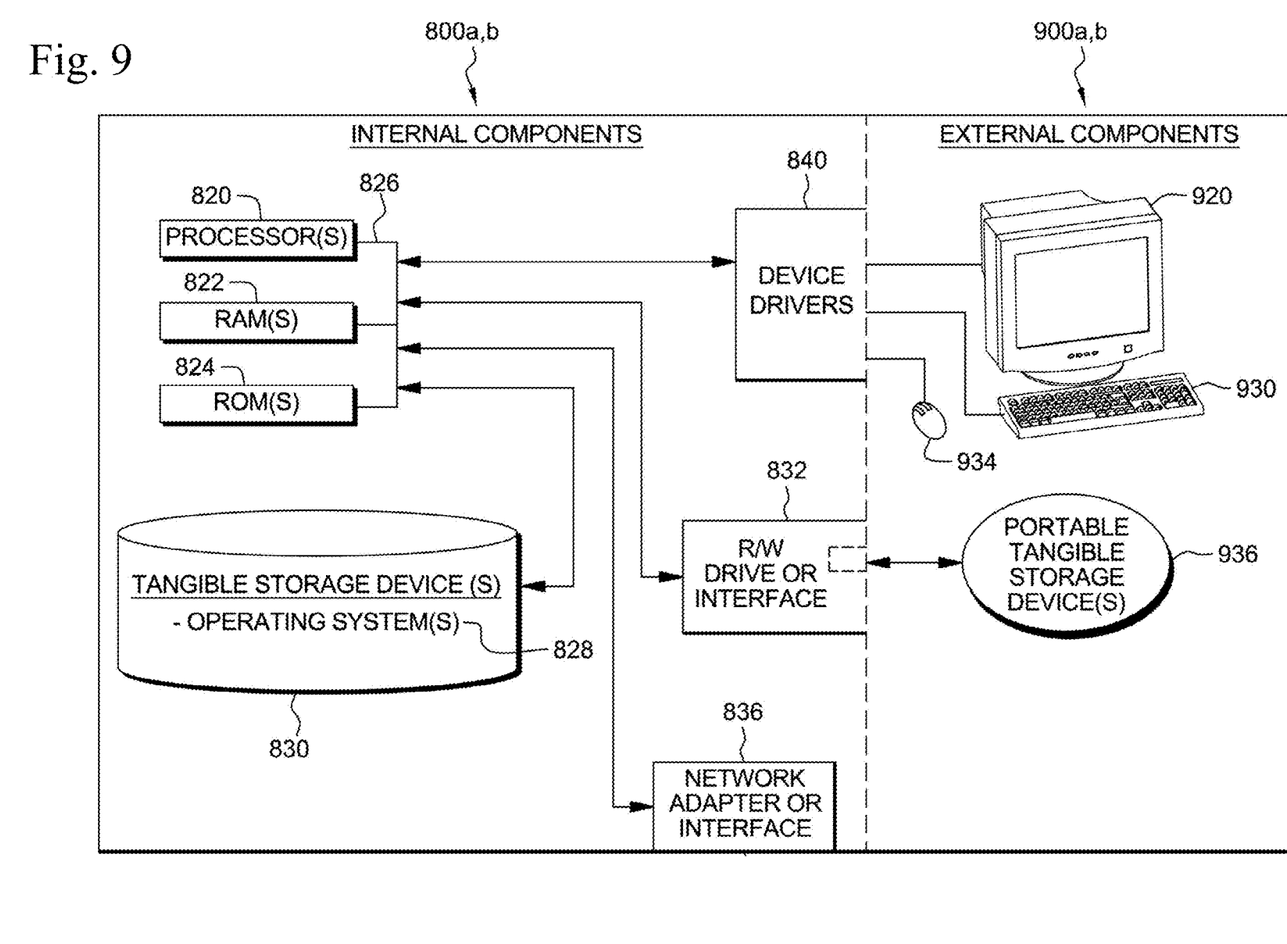
FIG. 9 illustrates internal and external components of a client computer and a server computer in which illustrative embodiments may be implemented.

Client computers 52A-52N each include a set of internal components 800a and a set of external components 900a, further illustrated in FIG. 9. Each of the client computers 52 may be, for example an unmanned vehicle.

Client computer 52 may contain an interface 55. The interface 55 may accept commands and data entry from a user or person remotely controlling the unmanned vehicle. The interface can be, for example, a command line interface, a graphical user interface (GUI), or a web user interface (WUI). The client computer 52 may include an unsafe situation program 66.

Server computer 54 includes a set of internal components 800b and a set of external components 900b illustrated in FIG. 9. Server computer 54 may contain an interface 57. The interface 57 can be, for example, a command line interface, a graphical user interface (GUI), or a web user interface (WUI) through which an evacuation program 67 may be accessed. Alternatively, the evacuation program 67 may be on client computers 52A-52N.

In the depicted example, server computer 54 provides information, such as boot files, operating system images, strategic evacuation plans/positioning, instructions for evacuation, and applications to the client computers 52A-52N. Server computer 54 can compute the information locally or extract the information from other computers on network 50.

Program code and programs such as unsafe situation program 66 and evacuation program 67 may be stored on at least one of one or more computer-readable tangible storage devices 830 shown in FIG. 9, on at least one of one or more portable computer-readable tangible storage devices 936 as shown in FIG. 9, or on storage unit 53 connected to network 50, or may be downloaded to a computer, such as client computers 52A-52N or server computer 54, for use.

For example, program code and programs such as unsafe situation program 66 may be stored on at least one of one or more storage devices 830 on server computer 54 and downloaded to client computer 52 over network 50 for use on client computers 52A-52N. Alternatively, server computer 54 can be a web server, and the program code, and programs such as unsafe situation program 66 may be stored on at least one of the one or more storage devices 830 on server computer 54 and accessed on client computers 52A-52N. In other exemplary embodiments, the program code, and programs such as unsafe situation program 66 may be stored on at least one of one or more computer-readable storage devices 830 on client computers 52A-52N or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIGS. 2A, 2B, 7 and 8 show examples of different types of unmanned vehicles with mounted displays 103 and associated screens 104, such as an unmanned aerial vehicle 102, an unmanned terrestrial vehicle 120 and an aquatic unmanned vehicle 122. The mounted display 103 for each of the unmanned vehicles is the same and will be described in detail in reference to FIGS. 2A and 2B only.

Figures 2A, 2B:
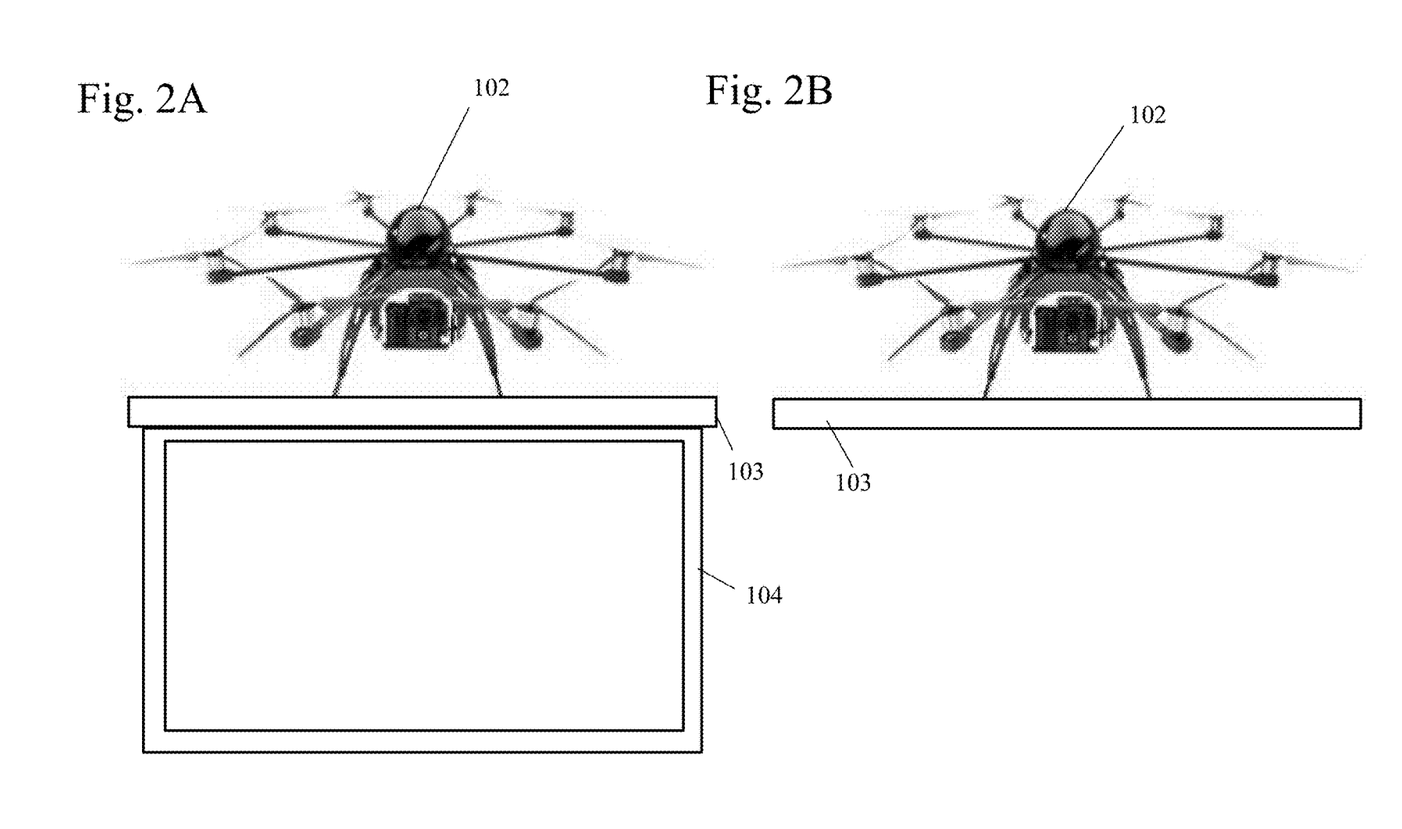
FIG. 2A shows an example of a UAV with a mounted display in a first position.
FIG. 2B shows an example of a UAV with a mounted display in a second position.

FIGS. 2A and 2B show an example of an unmanned vehicle such as a UAV with a mounted display. The mounted display 103 of the UAV 102 may have a screen 104 with a first position in which screen is unrolled or flipped down such that an image or text may be displayed (see FIG. 2A) and a second position in which the screen 104 is rolled up (see FIG. 2B). The screen 104 does not interfere with the flight of the UAV and may be mounted in other ways not shown in the figure. The screen 104 is preferably lightweight, flexible, and draws minimal power.

Guidance information is preferably displayed on the screen 104 through a projector or other device (not shown) and may provide guidance through a combination of internationally recognized colors, symbols, and directional arrows. The display of the guidance on the screen 104 of the UAV 102 is preferably bright enough for people to see at a distance. The guidance displayed on the screen 104 preferably provides instructions regarding the safest path to evacuate people from the unsafe situation as well as marking certain areas to avoid due to potential danger. The guidance present on the screen 104 may be updated dynamically as appropriate to the situation.

Figure 3A:
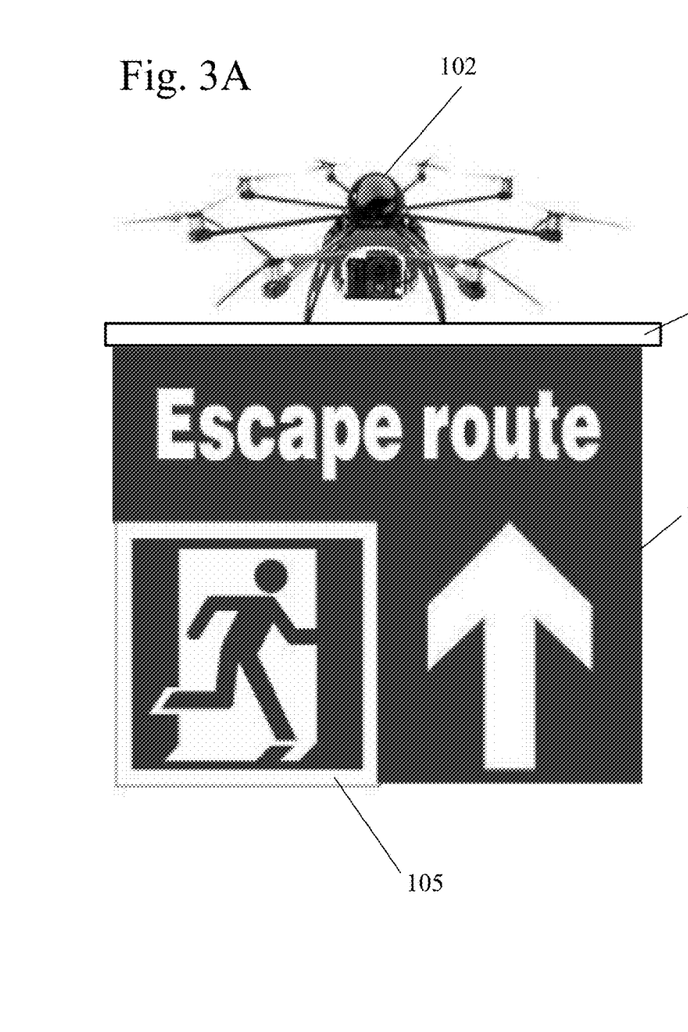
FIG. 3A shows an example of a display of guidance regarding an evacuation route from an unsafe situation.
Figure 3B:
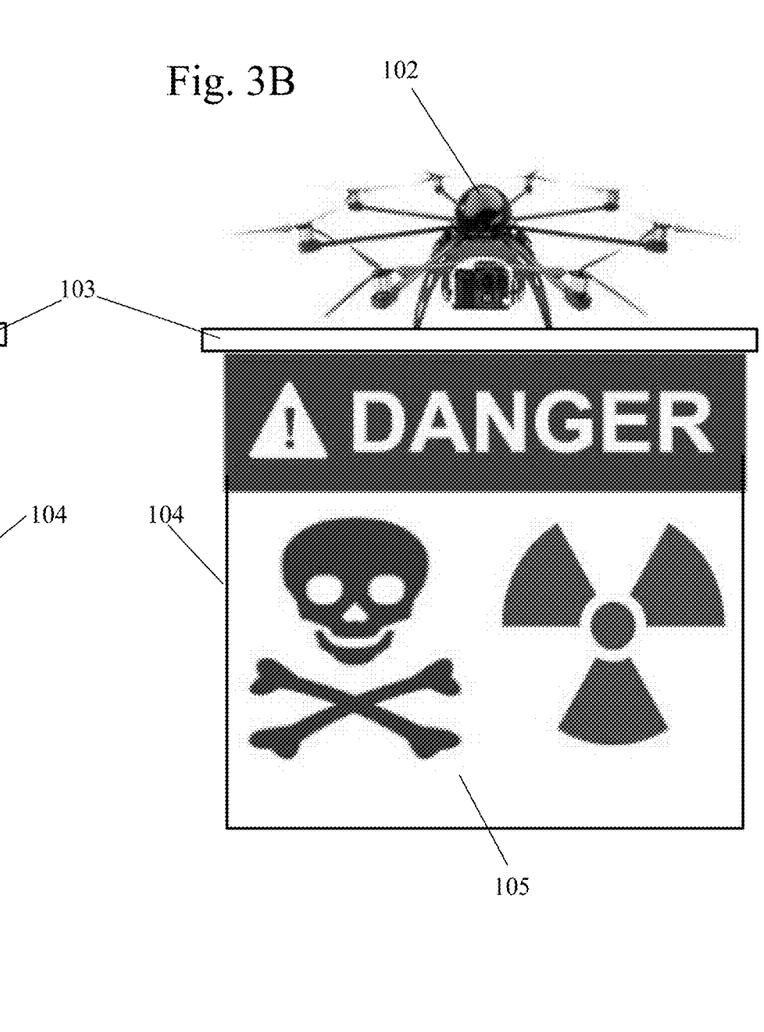
FIG. 3B shows an example of a display of guidance regarding danger relating to an unsafe situation.
Figure 3C:
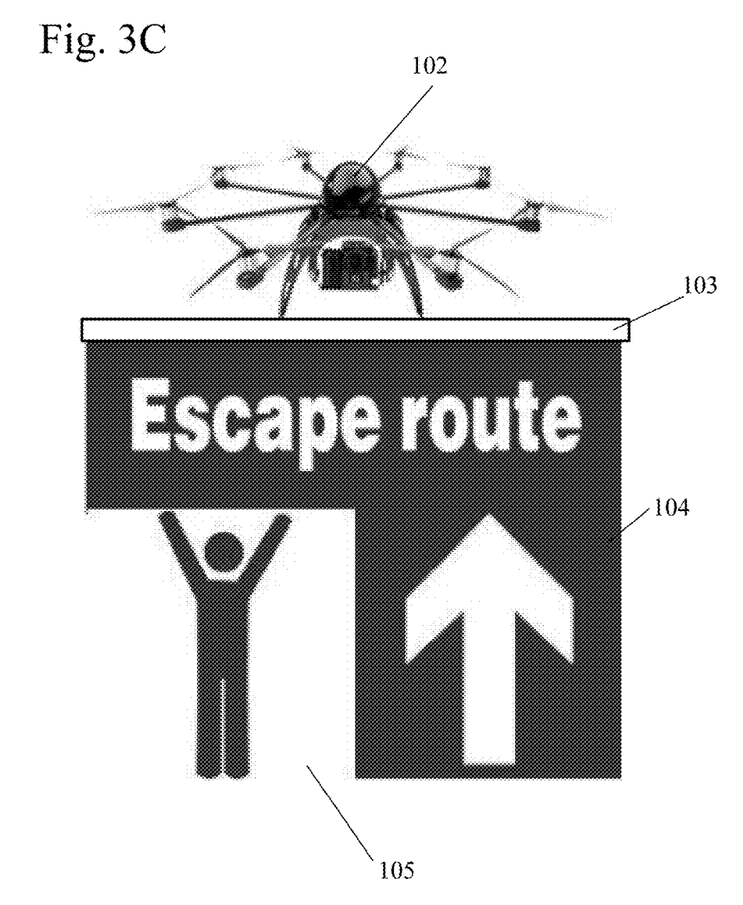
FIG. 3C shows an example of a display of guidance regarding an evacuation route from a specific unsafe situation.

For example, FIG. 3A shows a UAV 102 with a screen 104 in a position showing guidance 105 regarding a direction of an escape route from an unsafe situation. FIG. 3B shows a UAV 102 with a screen 104 in a position showing guidance 105 that includes a warning of an invisible danger in the area, for example possible radiation, poison gas, etc. FIG. 3C shows a UAV 102 with a screen 104 in a position showing guidance 105 regarding an escape route for a specific type of situation, for example a hostage situation. It should be noted that the guidance presented on the screen in FIGS. 3A-3C is not limited to the symbols or guidance shown.

While not shown, the unmanned vehicle may also include other means of communication that would provide guidance to people at an impacted or unsafe location. For example, a speaker may be attached to the unmanned vehicles and may be able to broadcast details regarding a safe path away from the danger or unsafe situation or other directions for when people are on the path from the unsafe situation. The broadcast may be in multiple languages. Additionally, the unmanned vehicles may also include reflective material and lights, such as LED lights to shine on the path being used or the unmanned vehicle itself.

Additionally, the unmanned vehicle may be able to communicate through the unsafe situation program 66 to a server computer and an evacuation program 67 to communication real-time information regarding the evacuation to first responders or other people attempting to control the unsafe situation (e.g. police, military, firefighters, etc.). The real-time information may also be used to alter an evacuation route to protect first responders from people being evacuated, preventing the first responders from being injured by the people evacuating or allowing the first responders a direct route to the impacted location, separate from the people being evacuated. The real-time information may include, but is not limited to: number of people that have passed through the safe route, number of people heading in the wrong direction on the safe route, people in need of assistance, blockages on the safe route, bottleneck of people on the safe route, or other information regarding the unsafe situation itself.

The unmanned vehicles may be based at the location itself or at a remote location and travel to the impacted area via air, land, and/or sea.

The unmanned vehicles may be deployed as a group to an impacted area and may be deployed to different locations, which may include, but are not limited to: sports arenas, stadiums, college campuses, office campuses, parks, and other locations.

The unmanned vehicles may be prepopulated with venue plans, evacuation scenarios, available exits, street maps, or other information in advance of any emergency, which may be executed using the unsafe situation program 66.

It should be noted that a network of unmanned vehicles could be deployed very quickly in an emergency, shut down quickly after the emergency and returned to their point of origin, locally stored at a venue, centrally based and quickly instructed to travel to a location which is impacted. The unmanned vehicles may be controlled by someone located at the impacted area itself or someone located remotely using the unmanned vehicles as an observation tool.

The unmanned vehicles are preferably not confined to one building or location and may expand to beyond the impact area to provide a safe route via the surrounding area or streets. The unmanned vehicles and the guidance being provided by the unmanned vehicles may be dynamically adjusted based on changing conditions at an impacted location.

The unmanned vehicles may all be the same type of vehicle (e.g. all aerial or terrestrial or aquatic) or a mix of different types of unmanned vehicles (e.g. some aerial, some terrestrial and some aquatic).

The unmanned vehicles which are UAVs are not restricted to conditions on the ground and may be deployed to an impacted area where land vehicles cannot reach.

Figure 4:
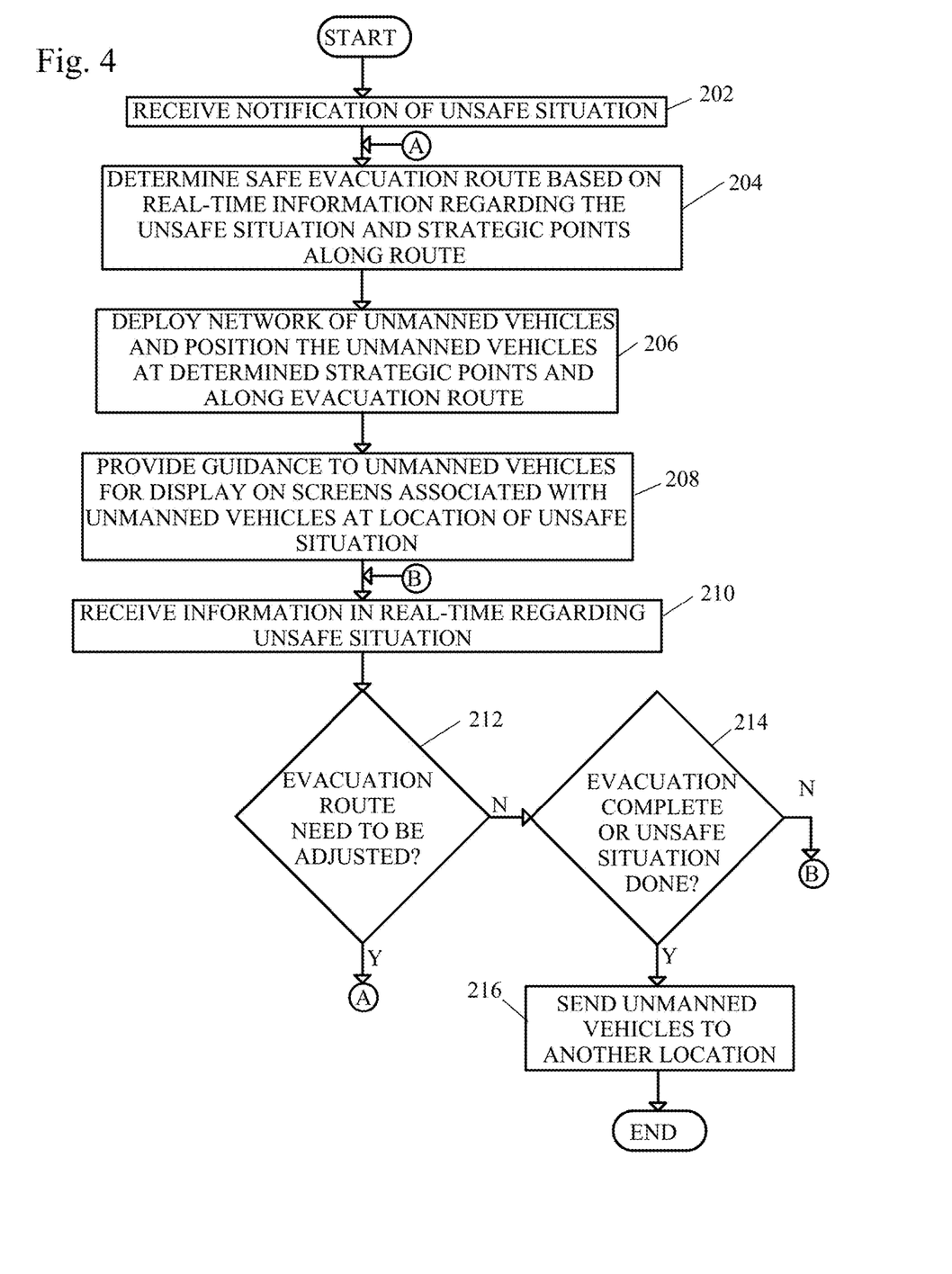
FIG. 4 shows a flow diagram or a method of dynamically establishing a temporary safe route using UAVs.

FIG. 4 shows a flow diagram or a method of dynamically establishing a temporary safe route using unmanned vehicles.

In a first step, an evacuation program 67 may receive a notification of an unsafe location (step 202). The notification may include, but is not limited to, real-time information regarding the number of people at a location, the unsafe situation at the location, and other information. The notification and real-time information may be provided by first responders, military, police, firefighters or others.

A safe evacuation route is determined based on real-time information regarding the situation as well as strategic points along the route (step 204). The safe evacuation route may be predetermined, remote controlled live during the unsafe situation.

The evacuation program 67 deploys a network of unmanned vehicles to positions at determined strategic points and along the determined safe evacuation route (step 206) to provide input for the unmanned vehicles to output to people along the determined safe evacuation route. The unmanned vehicles output guidance for people along the evacuation route and the guidance may be a display of internationally recognized colors, symbols, or directions or audio output (step 208). The output may be executed by the unsafe situation program 66 of the unmanned vehicles.

From the unsafe situation program 66 in the unmanned vehicles, the evacuation program 67 receives information in real-time regarding the evacuation and the unsafe situation (step 210). The information may be received from the unmanned vehicle or from law enforcement personnel, other first responders, or others at the unsafe location. The information may be, but is not limited to, number of people that have passed through the safe route, number of people heading in the wrong direction on the safe route, people in need of assistance, blockages on the safe route, bottleneck of people on the safe route, or other information regarding the unsafe situation itself. Information from the unmanned vehicle may be detected by the unmanned vehicles through sensors.

If the evacuation route needs to be adjusted (step 212), the method returns to step 204 of determining a safe evaluation route based on real-time information regarding the situation as well as strategic points along the route. For example, the unmanned vehicles may use the information it detects in real-time regarding the evacuation and the unsafe situation in self-determining a type of action, signage/symbols to provide appropriate instructions to people, which are different than was previously presented or to adjust the evacuation route.

If the evacuation route does not need to be adjusted (step 212), and the evacuation is complete or the unsafe situation has been resolved (step 214), the evacuation program 66 sends the unmanned vehicles to another location (step 216) and the method ends. The other location may be another unsafe situation or an origin point.

If the evacuation route does not need to be adjusted (step 212), and the evacuation is complete or the unsafe situation has not been resolved (step 214), the method continues to step 210 of receiving information from the unmanned vehicle in real-time regarding the evacuation.

Figure 5:
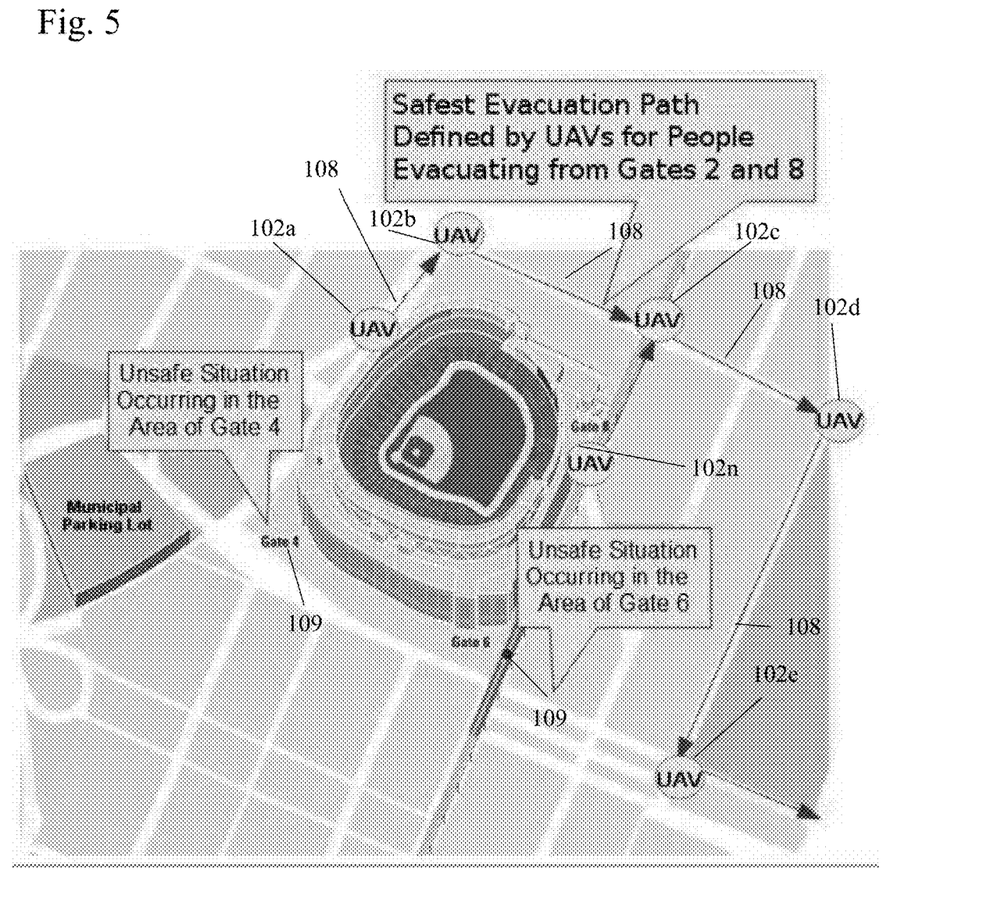
FIG. 5 shows an example of using UAVs to evacuate people out of different exits of a building due to unsafe conditions at other exits.

FIG. 5 shows an example of using UAVs to evacuate people out of different exits of a building due to unsafe conditions at other exits.

An unsafe situation 109 at a location is received, which in this case is at Gate 4 and Gate 6 of a stadium full of people. An evacuation program 67 deploys a network of UAVs 102a-102n to positions at determined strategic points to provide an evacuation route 108 away from the unsafe situation 109. In this example, UAVs are present to divert people in the stadium away from the unsafe situations 109 at Gate 4 and Gate 6 and evacuate people through Gates 2 and 8. The guidance displayed by the UAVs may be similar to the guidance displayed in FIG. 3A. The UAVs through an unsafe situation program 66, report information regarding the unsafe situation 109 and the evacuation to the evacuation program 67. The evacuation program 66 may provide the information regarding the unsafe situation 109 and the evacuation to first responders or law enforcement or other personnel aiding with the evacuation. If the evacuation route needs to be adjusted, the UAVs will be deployed to another strategic point and the evacuation route can be adjusted. If the evacuation route does not need to be adjusted and the evacuation is complete, the UAVs are deployed to another location.

Figure 6:
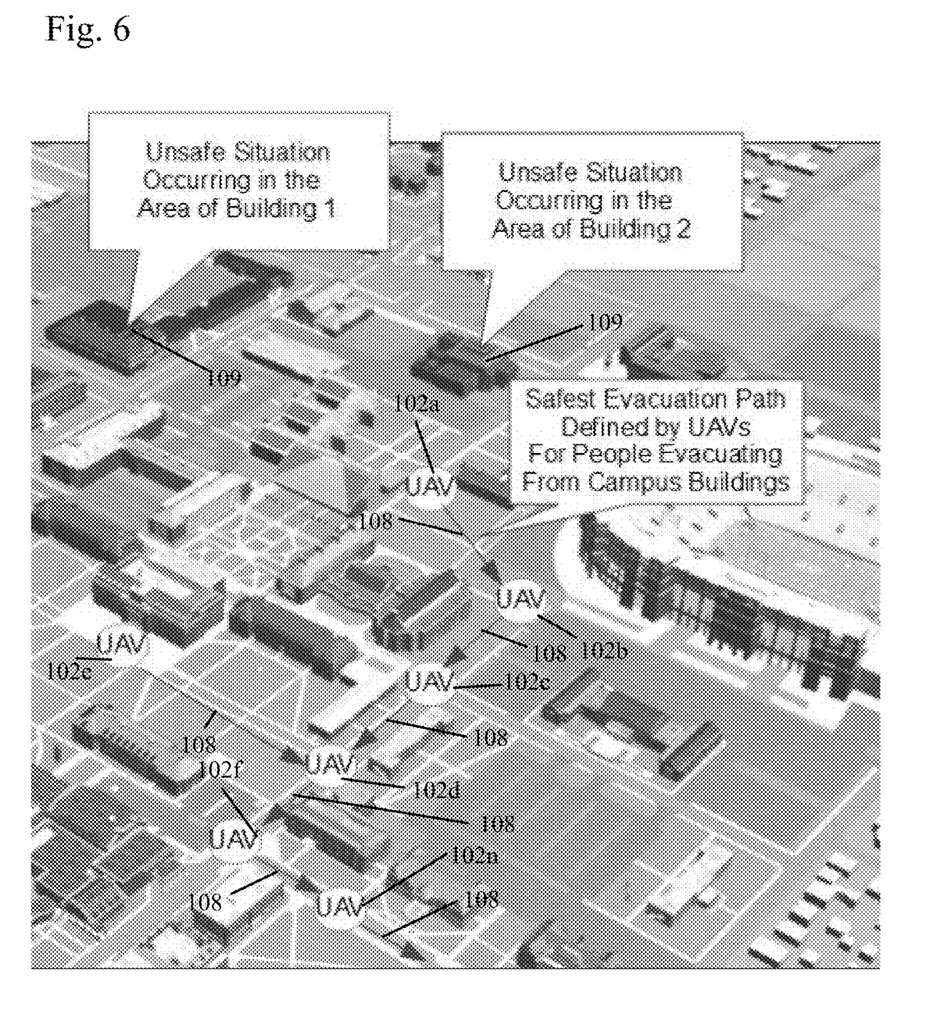
FIG. 6 shows an example of an unsafe situation in a building and an evacuation route for people from nearby buildings.
Figure 7:
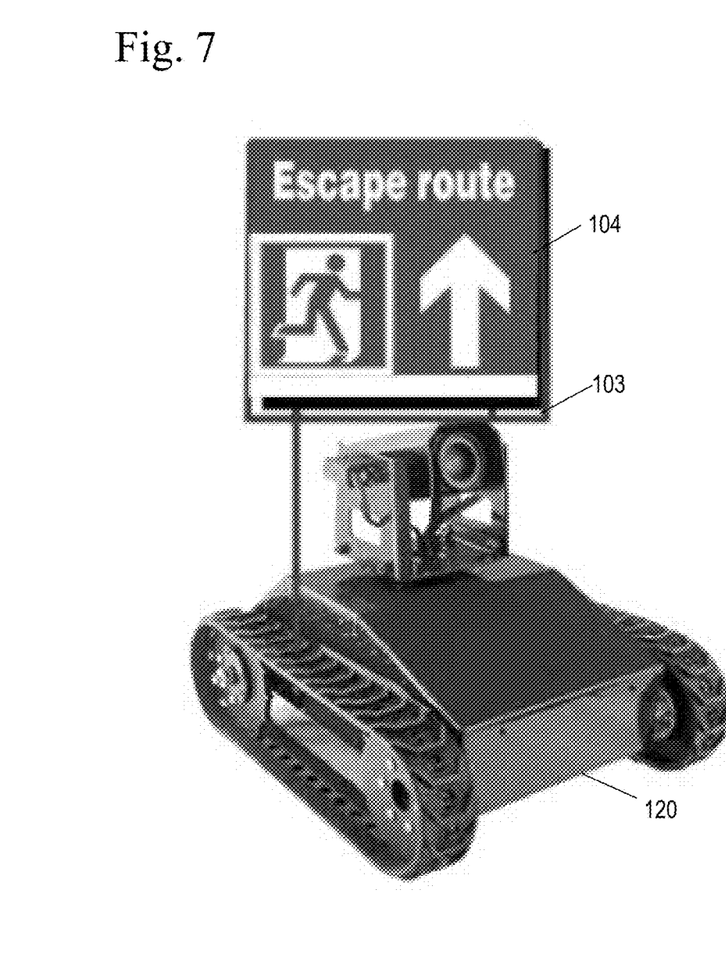
FIG. 7 shows an example of a terrestrial unmanned vehicle with a mounted display.
Figure 8:
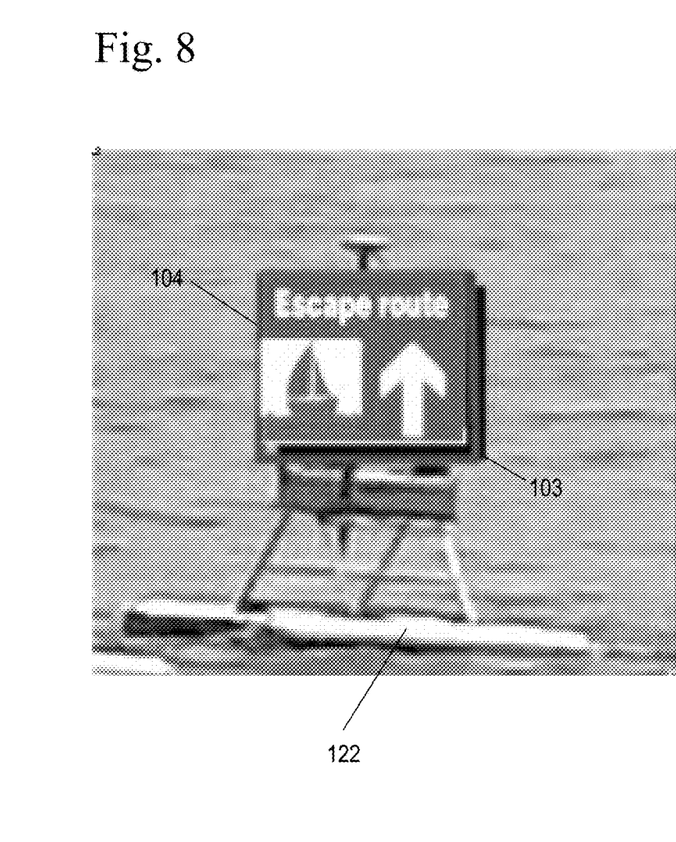
FIG. 8 shows an example of an aquatic unmanned vehicle with a mounted display.

FIG. 6 shows an example of an unsafe situation in a building and an evacuation route for people from nearby buildings.

In this example, the unsafe situation 109 is occurring in an area of Building 2 and Building 1. Based on the unsafe situation 109 received, UAVs 102a-102n are deployed to strategic points along an evacuation route 108. Some of the UAVs may be deployed to warn of danger in a specific area, for example UAV 102e. The guidance may be similar to that shown in FIG. 3B. The UAVs through an unsafe situation program 66, report information regarding the unsafe situation 109 and the evacuation to the evacuation program 67. The evacuation program 66 may provide the information regarding the unsafe situation 109 and the evacuation to first responders or law enforcement or other personnel aiding with the evacuation. If the evacuation route needs to be adjusted, the UAVs will be deployed to another strategic point and the evacuation route can be adjusted. If the evacuation route does not need to be adjusted and the evacuation is complete, the UAVs are deployed to another location.

In an alternate embodiment, the unmanned vehicles may be cognitive autonomic vehicles which can detect and determine unsafe situations and/or things to living things. For example, sensor detection of radiation, dangerous gases, etc. In this embodiment, the unmanned vehicle does not need to communication with the server computer 54 to operate during an evacuation.

An evacuation program 67 may receive a notification of an unsafe location. The notification may include, but is not limited to, real-time information regarding the number of people at a location, the unsafe situation at the location, and other information. The notification and real-time information may be provided by first responders, military, police, firefighters or others.

A safe evacuation route is determined based on real-time information regarding the situation as well as strategic points along the route. The safe evacuation route may be predetermined, remote controlled live during the unsafe situation.

The evacuation program 67 deploys a network of unmanned vehicles to positions at determined strategic points and along the determined safe evacuation route to provide input for the unmanned vehicles to output to people along the determined safe evacuation route. The unmanned vehicles at these determined strategic points may use autonomic functionality to determine if additional unsafe situations are present or determine when the unsafe situation has altered and output guidance for people along the evacuation route as necessary.

The unmanned vehicles may relay the information to one or more peer unmanned vehicles for additional assistance if the unmanned vehicle is in dead zone, high radiation, or some other situation in which information is prevented from reaching the evacuation program 67 on the server computer.

FIG. 9 illustrates internal and external components of client computer 52 and server computer 54 in which illustrative embodiments may be implemented. In FIG. 9, a client computer 52 and a server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, unsafe situation program 66, evacuation program 67 are stored on at least one of one or more of the computer-readable tangible storage devices 830 for execution by at least one of one or more of the processors 820 via at least one of one or more of the RAMs 822 (which typically include cache memory). In the embodiment illustrated in FIG. 9, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Unsafe situation program 66 and evacuation program 67 can be stored on at least one of one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Unsafe situation program 66 and evacuation program 67 can be downloaded to client computer 52 and server computer 54 from an external computer via a network (for example, the Internet, a local area network or other, wide area network) and network adapter or interface 836. From the network adapter or interface 836, unsafe situation program 66 and evacuation program 67 may be loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Unsafe situation program 66 and evacuation program 67 can be written in various programming languages including low-level, high-level, object-oriented or non object-oriented languages. Alternatively, the functions of unsafe situation program 66 and evacuation program 67 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of dynamically establishing a temporary safe evacuation route away from an unsafe situation using unmanned cognitive vehicles comprising the steps of:
   the unmanned cognitive vehicles receiving a deployment to the unsafe situation and positioning information regarding placement of the unmanned cognitive vehicles at determined points along the temporary safe evacuation route;
   the unmanned cognitive vehicles detecting and determining information regarding the unsafe situation through autonomic functionality sensors;
   the unmanned cognitive vehicles relaying the information regarding the unsafe situation to peer unmanned cognitive vehicles;
   the unmanned cognitive vehicles displaying guidance along the safe evacuation route to aid people in evacuating from the unsafe situation;
   the unmanned cognitive vehicles receiving information regarding whether the unsafe situation has been altered from peer unmanned cognitive vehicles; and
   the unmanned cognitive vehicles, based on the information received, determining whether the safe evacuation route should be adjusted.

2. The method of claim 1, wherein the autonomic functionality sensors of the unmanned cognitive vehicles detect information regarding safety to living things, the information consisting of the presence of: radiation, dangerous gases, dangerous elements, and dangerous chemicals.

3. The method of claim 1, wherein the unmanned cognitive vehicles further comprise stored information consisting of: evacuation scenarios, available exits, and street maps.

4. The method of claim 1, wherein the unmanned cognitive vehicles are deployed by a user at the unsafe situation.

5. The method of claim 1, wherein the unmanned cognitive vehicles relay the information regarding the unsafe situation to users working to alleviate the unsafe situation.

6. The method of claim 1, wherein the guidance for display provides information regarding the safe evacuation route to people at the unsafe situation.

7. The method of claim 1, wherein the guidance for display provides information warning against the unsafe situation.

8. The method of claim 1, wherein the safe evacuation route includes strategic points off of the evacuation route.

9. A computer program product for dynamically establishing a temporary safe evacuation route away from an unsafe situation using unmanned cognitive vehicles comprising a computer comprising at least one processor, one or more memories, one or more non-transitory computer readable storage media, the computer program product comprising a computer readable storage medium having program instructions embodied therewith, the program instructions executable by the computer to perform a method comprising:
   receiving, by the computer of the unmanned cognitive vehicles, a deployment to the unsafe situation and positioning information regarding placement of the unmanned cognitive vehicles at determined points along the temporary safe evacuation route;
   detecting and determining, by the computer of the unmanned cognitive vehicles, information regarding the unsafe situation through autonomic functionality sensors;
   relaying, by the computer of the unmanned cognitive vehicles, the information regarding the unsafe situation to peer unmanned cognitive vehicles;
   displaying, by the computer of the unmanned cognitive vehicles, guidance along the safe evacuation route to aid people in evacuating from the unsafe situation;
   receiving, by the computer of the unmanned cognitive vehicles, information regarding whether the unsafe situation has been altered from peer unmanned cognitive vehicles; and
   based on the information received, determining, by the computer of the unmanned cognitive vehicles, whether the safe evacuation route should be adjusted.

10. The computer program product of claim 9, wherein the autonomic functionality sensors of the unmanned cognitive vehicles detect information regarding safety to living things, the information consisting of the presence of: radiation, dangerous gases, dangerous elements, and dangerous chemicals.

11. The computer program product of claim 9, wherein the unmanned cognitive vehicles further comprise stored information consisting of: evacuation scenarios, available exits, and street maps.

12. The computer program product of claim 9, wherein the unmanned cognitive vehicles are deployed by a user at the unsafe situation.

13. The computer program product of claim 9, wherein the unmanned cognitive vehicles relay the information regarding the unsafe situation to users working to alleviate the unsafe situation.

14. The computer program product of claim 9, wherein the guidance for display provides information regarding the safe evacuation route to people at the unsafe situation.

15. The computer program product of claim 9, wherein the guidance for display provides information warning against the unsafe situation.

16. The computer program product of claim 9, wherein the safe evacuation route includes strategic points off of the evacuation route.

17. A computer system for dynamically establishing a temporary safe evacuation route away from an unsafe situation using unmanned vehicles comprising a computer comprising at least one processor, one or more memories, one or more non-transitory computer readable storage media having program instructions executable by the computer to perform the program instructions comprising:
   receiving, by the computer of the unmanned cognitive vehicles, a deployment to the unsafe situation and positioning information regarding placement of the unmanned cognitive vehicles at determined points along the temporary safe evacuation route;

detecting and determining, by the computer of the unmanned cognitive vehicles, information regarding the unsafe situation through autonomic functionality sensors;

relaying, by the computer of the unmanned cognitive vehicles, the information regarding the unsafe situation to peer unmanned cognitive vehicles;

displaying, by the computer of the unmanned cognitive vehicles, guidance along the safe evacuation route to aid people in evacuating from the unsafe situation;

receiving, by the computer of the unmanned cognitive vehicles, information regarding whether the unsafe situation has been altered from peer unmanned cognitive vehicles; and based on the information received, determining, by the computer of the unmanned cognitive vehicles, whether the safe evacuation route should be adjusted.

18. The computer system of claim 17, wherein the autonomic functionality sensors of the unmanned cognitive vehicles detect information regarding safety to living things, the information consisting of the presence of: radiation, dangerous gases, dangerous elements, and dangerous chemicals.

19. The computer system of claim 17, wherein the unmanned cognitive vehicles further comprise stored information consisting of: evacuation scenarios, available exits, and street maps.

20. The computer system of claim 17, wherein the unmanned cognitive vehicles relay the information regarding the unsafe situation to users working to alleviate the unsafe situation.

* * * * *